(12) United States Patent
Yutkowitz et al.

(10) Patent No.: US 12,346,086 B2
(45) Date of Patent: Jul. 1, 2025

(54) REDUCTION OF FRICTION WITHIN A MACHINE TOOL

(71) Applicant: Siemens Aktiengesellschaft, Munich (DE)

(72) Inventors: Stephen Yutkowitz, Cincinnati, OH (US); Daniel Hein, Munich (DE); Steffen Udluft, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 380 days.

(21) Appl. No.: 17/914,531

(22) PCT Filed: Mar. 23, 2021

(86) PCT No.: PCT/EP2021/057457
§ 371 (c)(1),
(2) Date: Sep. 26, 2022

(87) PCT Pub. No.: WO2021/197935
PCT Pub. Date: Oct. 7, 2021

(65) Prior Publication Data
US 2023/0141311 A1 May 11, 2023

(30) Foreign Application Priority Data
Apr. 1, 2020 (EP) .................................... 20167577

(51) Int. Cl.
*G05B 19/404* (2006.01)
(52) U.S. Cl.
CPC .. *G05B 19/404* (2013.01); *G05B 2219/41161* (2013.01)
(58) Field of Classification Search
CPC ................ G05B 19/404; G05B 2219/41161
(Continued)

(56) References Cited

U.S. PATENT DOCUMENTS 6,060,854 A * 5/2000 Yutkowitz ............ G05B 19/404
318/632
6,859,747 B2 * 2/2005 Yutkowitz ............ G05B 19/404
356/498
(Continued)

FOREIGN PATENT DOCUMENTS

CN 202433735 U 9/2012
CN 102736557 A 10/2012
(Continued)

OTHER PUBLICATIONS

Ferreira, Wallace G. et al: "Ensemble of metamodels: the augmented least squares approach"; Structural and Multidisciplinary Optimization; Springer Berlin Heidelberg; Berlin/Heidelberg, vol. 53; No. 5; Dec. 15, 2015; pp. 1019-1046; XP035857461.
(Continued)

*Primary Examiner* — Chun Cao
(74) *Attorney, Agent, or Firm* — Schmeiser, Olsen & Watts LLP

(57) ABSTRACT

A computer-implemented method for reducing friction within a machine tool is provided, including: a) reading a plurality of surrogate models for approximating friction compensation within a given machine tool, b) reading a friction compensation parameter set, c) determining a friction compensation result value for each surrogate model using the compensation parameter set, d) determining a weighted average friction compensation value of the friction compensation result values using the respective weighting factor, e) deducing a quality indicator for the friction compensation parameter set based on the weighted average friction compensation value, f) outputting the friction compensation parameter set, if the quality indicator fulfils a given quality criterion, or repeating b) to e) until the quality indicator fulfills the given quality criterion, g) applying the (Continued)

outputted friction compensation parameter set to the machine tool for reducing friction within the machine tool.

12 Claims, 3 Drawing Sheets

(58) Field of Classification Search
USPC .......................................................... 700/193
See application file for complete search history.

(56) References Cited

U.S. PATENT DOCUMENTS

| | | | | |
|---|---|---|---|---|
| 7,084,596 | B2* | 8/2006 | Iwashita | G05B 19/404 |
| | | | | 318/632 |
| 2015/0145464 | A1* | 5/2015 | Fujimoto | G05B 19/404 |
| | | | | 318/632 |
| 2016/0239594 | A1 | 8/2016 | Fujita et al. | |
| 2019/0317472 | A1 | 10/2019 | Zhi et al. | |
| 2020/0130660 | A1* | 4/2020 | Cho | B60T 8/1764 |
| 2020/0225638 | A1* | 7/2020 | Takahei | G05B 19/404 |
| 2021/0088998 | A1* | 3/2021 | Shinoda | G05B 19/404 |

FOREIGN PATENT DOCUMENTS

| | | |
|---|---|---|
| CN | 103048949 A | 4/2013 |
| CN | 105814506 A | 7/2016 |
| JP | 2000259202 A | 9/2000 |

OTHER PUBLICATIONS

PCT International Search Report and Written Opinion of International Searching Authority mailed Jun. 21, 2021 corresponding to PCT International Application No. PCT/EP2021/057457.

Tang Rulong:; "Friction Compensation and Simulation Research of Machine Tool Servo System"; Jun. 30, 2018.

Xiao Huixiao et al:; "Research on the Implementation of Error Compensation for CNC Machine Tools Based on FANUC and SIEMENS 840D Systems"; Jun. 15, 2015.

* cited by examiner

REDUCTION OF FRICTION WITHIN A MACHINE TOOL

CROSS-REFERENCE TO RELATED APPLICATIONS

This application claims priority to PCT Application No. PCT/EP2021/057457, having a filing date of Mar. 23, 2021, which claims priority to EP Application No. 20167577.4, having a filing date of Apr. 1, 2020, the entire contents both of which are hereby incorporated by reference.

FIELD OF TECHNOLOGY

The following relates to a computer-implemented method and an apparatus for reducing friction within a machine tool.

BACKGROUND

Computerized numerical control (CNC) machines are machine tools capable of automatically producing workpieces with high precision even for complex shapes. These machine tools allow high precision manufacturing across industries. However, the friction within the machine tool, i.e., between mechanical components, leads to deviations between a controlled and an actually executed position of the tool. Such deviations due to friction can affect a targeted tolerance of a produced part.

It is therefore required to reduce the friction between mechanical parts of a machine tool. Friction compensation controllers with tuned parameters correct errors during manufacturing introducing opposing forces. Due to variations in the forces and resulting friction of different machine parts, a controller must be set individually for each machine. Furthermore, over the lifetime of the machine, these parameters must be recalibrated.

Conventionally, an expert technician manually tunes these parameters, requiring interruption of production schedules and causing machine downtime. In addition, an irregular tuning and inconsistent quality among expert technicians can lead to loss of tolerance and thereby reduced quality of finished parts.

SUMMARY

An aspect relates to improving the friction compensation within a machine tool.

According to a first aspect, embodiments of the invention provide a computer-implemented method for reducing friction within a machine tool, comprising the method steps:
a) reading a plurality of surrogate models for approximating friction compensation within a given machine tool, wherein each surrogate model is configured such that it assigns a friction compensation result value to a given friction compensation parameter set for reducing friction within a machine tool, and wherein a weighting factor is assigned to each surrogate model, the weighting factor representing a goodness-of-fit of a surrogate model to a machine tool,
b) reading a friction compensation parameter set,
c) determining a friction compensation result value for each surrogate model using the compensation parameter set,
d) determining a weighted average friction compensation value of the friction compensation result values using the respective weighting factor of the respective surrogate model,
e) determining a quality indicator for the friction compensation parameter set based on the weighted average friction compensation value,
f) outputting the friction compensation parameter set, if the quality indicator fulfills a given quality criterion, or otherwise repeating steps b) to e) until the quality indicator fulfills the given quality criterion,
g) applying the outputted friction compensation parameter set to the machine tool for reducing friction within the machine tool.

If not indicated differently the terms "calculate", "perform", "computer-implemented", "compute", "determine", "generate", "configure", "reconstruct", and the like, may be related to acts and/or processes and/or steps which change and/or generate data, wherein data can particularly be presented as physical data, and which can be performed by a computer or processor. The term "computer" can be interpreted broadly and can be a personal computer, server, mobile computing device, or a processor such as a central processing unit (CPU) or microprocessor.

The machine tool can for example be a computerized numerical control (CNC) machine tool. In embodiments, a surrogate model may be a computerized model, which is configured to approximate or fit the friction compensation behavior within a machine tool. The friction compensation, i.e., the application of for example an opposing or balancing force to reduce a frictional force, within a machine tool depends on the applied friction compensation parameter set for controlling the machine tool.

A surrogate model can for example be a fitting model, a regression model or an artificial neural network. In embodiments, a surrogate model may be suited to represent the physical behavior, i.e., particularly the friction between machine parts of the machine tool due to internal forces. A friction compensation parameter set can be understood as input values for a surrogate model. Furthermore, a friction compensation parameter set is input for setting a machine tool in order to reduce internal frictional forces. In embodiments, a weighting factor may represent the likelihood of the respective surrogate model to correctly reproduce the friction compensation response within a machine tool. In other words, the weighting factor represents the goodness-of-fit of a respective surrogate model to the friction compensation response of a machine tool.

The proposed method has the advantage that an optimized friction compensation parameter set for setting a machine tool can be found in an automated way such that internal friction is reduced within the machine tool. Furthermore, the method can be applied on-site, i.e., in parallel with operations of the machine tool, due to computing speed.

The friction compensation parameter set is used to set the machine tool such that for example an opposing force is applied in a way that a frictional force between machine parts is reduced. Less calibration effort to calibrate the machine tool is necessary and/or better calibration results can be achieved. Moreover, embodiments of the invention can particularly be applied to unknown machines.

Embodiments of the invention enable determination of an optimized parameter set for friction compensation within a machine tool using a plurality of surrogate models approximating the frictional forces of preferably similar machine tools.

In an embodiment of the computer-implemented method according to the first aspect of embodiments of the present invention, a real friction compensation result value of the machine tool can be measured based on the applied friction compensation parameter set, each weighting factor of the respective surrogate model can be modified depending on a discrepancy between each friction compensation result value and the measured real friction compensation result value resulting from the respective surrogate model and the aforementioned steps b) to g) can be repeated.

By adjusting the weighting factors of the used surrogate models based on the resulting friction compensation result value measured at the real machine tool, the approximation of the friction compensation for this machine tool can be optimized. In an embodiment, the adjustment of the weighting factors of the surrogate models and application of the friction compensation parameter is iteratively performed until a given stopping criterion is reached. Such stopping criterion can for example be a certain friction compensation quality, an expired tuning time, or the selected parameter set has been found to optimally fit to the real machine tool.

In a further embodiment of the computer-implemented method according to the first aspect of embodiments of the present invention, the plurality of surrogate models can be generated based on a given plurality of data sets by a regression method, wherein each data set comprises a friction compensation parameter set and a corresponding friction compensation result value of a resulting reduced friction within the respective machine tool.

In an embodiment, such data sets for generation of surrogate models for machine tools are stored in a database. Based on the available data, surrogate models can be trained by a regression method individually for each data set. The learning objective of a surrogate model is to estimate the friction compensation result for a given parameter set. Hence, the provided data sets can be used as training data for training these surrogate models. Possible regression techniques are for example linear and polynomial models, regression trees, artificial neural networks, or Gaussian processes.

In one embodiment of the computer-implemented method according to the first aspect of embodiments of the present invention, a data set can be generated based on a friction measurement at a real machine tool.

In one embodiment of the computer-implemented method according to the first aspect of embodiments of the present invention, a data set can be generated based on a dedicated computer-aided simulation of a machine tool.

The data sets can be stored in a database. The data sets are provided for surrogate model generation for friction compensation within a machine tool.

In one embodiment of the computer-implemented method according to the first aspect of embodiments of the present invention, the friction compensation parameter set can be generated by a fitness function, wherein the fitness function depends on the surrogate models and the respective weighting factor.

The friction compensation parameter set can be determined based on a computerized search of the parameter space using a fitness function. In embodiments, the fitness function may use the surrogate models and the respective weighting factors computing a scalar value which serves as indicator on the quality of the used parameter set.

In one embodiment of the computer-implemented method according to the first aspect of embodiments of the present invention, the plurality of surrogate models can be selected based on machine-specific identification data of the machine tool.

In an embodiment, the machine-specific identification data of the machine tool comprise manufacturing information data and/or machine type data. By using prior knowledge of the machine tool, the optimization process can be further improved. In an embodiment, before starting an on-site optimization process for a selected machine tool, the plurality of surrogate models used to approximate the friction compensation response of the machine tool is preselected. Hence, additional surrogate models which are for example not well suited to approximate this machine tool can be excluded.

According to a second aspect, embodiments of the invention relate to an apparatus for reducing friction within a machine tool, comprising:
  a) an input unit configured to read a plurality of surrogate models for approximating friction compensation within a given machine tool, wherein each surrogate model is configured such that it assigns a friction compensation result value to a given friction compensation parameter set for reducing friction within a machine tool, and wherein a weighting factor is assigned to each surrogate model, the weighting factor representing a goodness-of-fit of a surrogate model to a machine tool,
  b) an analysis unit configured to
    to read in a friction compensation parameter set,
    determine a friction compensation result value for each surrogate model using the compensation parameter set,
    determine a weighted average friction compensation value of the friction compensation result values using the respective weighting factor of the respective surrogate model, and
    determine a quality indicator for the friction compensation parameter set based on the weighted average friction compensation value,
  c) an output unit configured to output friction compensation parameter set, if the quality indicator fulfills a given quality criterion, or otherwise to repeat the steps performed by the analysis unit,
  and
  d) an application unit configured to apply the outputted friction compensation parameter set to the machine tool for reducing friction within the machine tool.

In embodiments, the apparatus is connected to the machine tool or it is part of the machine tool. The apparatus and/or at least one of its units can further comprise at least one processor or computer to perform the method steps according to embodiments of the invention. A respective unit may be implemented in hardware and/or in software. If the unit is implemented in hardware, it may be embodied as a device, e.g., as a computer or as a processor or as a part of a system. If the unit is implemented in software it may be embodied as a computer program product (non-transitory computer readable storage medium having instructions, which when executed by a processor, perform actions), as a function, as a routine, as a program code or as an executable object. In embodiments, the output unit may provide a data structure comprising the optimized compensation parameter. Such data structure can be for example transmitted to a control unit of the machine tool for setting the machine tool accordingly.

According to an embodiment of the apparatus, the application unit can be further configured to receive a measured real friction compensation result value of the machine tool based on the applied friction compensation parameter set, and the analysis unit is configured to modify each weighting factor of the respective surrogate model depending on a discrepancy between each friction compensation result value and the measured real friction compensation result value and resulting from the respective surrogate model and to repeat the steps b) to e) of the computer-implemented method according to the first aspect of embodiments of the invention.

According to an embodiment, the apparatus can comprise a generator which is configured to generate the plurality of surrogate models for friction compensation based on a given plurality of data sets by a regression method, wherein each data set comprises a friction compensation parameter for setting a machine tool and a corresponding friction compensation result of a resulting reduced friction within the respective machine tool.

According to a further embodiment, the apparatus can be connected to a database, wherein the database is configured to store data sets and/or surrogate models.

Embodiments of the invention further comprise a computer program product directly loadable into the internal memory of a digital computer, comprising software code portions for performing the steps of the the method when the product is run on a computer.

A computer program product, such as a computer program means, may be embodied as a memory card, USB stick, CD-ROM, DVD or as a file which may be downloaded from a server in a network.

BRIEF DESCRIPTION

Some of the embodiments will be described in detail, with reference to the following figures, wherein like designations denote like members, wherein.

DETAILED DESCRIPTION

Figure 1:
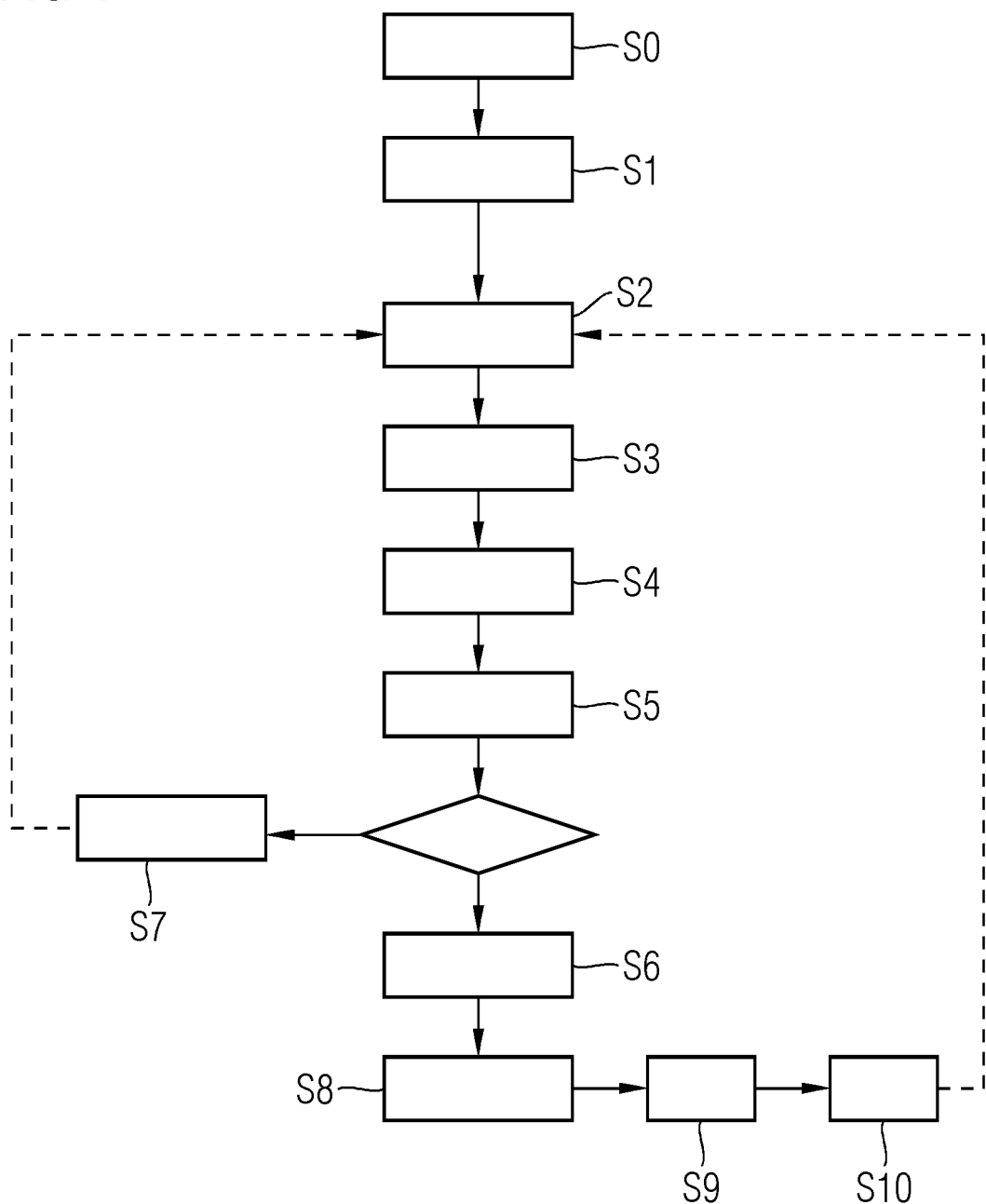
FIG. 1 shows a flow chart including method steps involved in an embodiment of the method for reducing friction within a machine tool.

FIG. 1 shows a flow chart illustrating the method steps involved in a computer-implemented method for reducing friction within a machine tool, for example a CNC machine tool. The method provides for example an optimized parameter set which can be applied to the machine tool to achieve optimal friction compensation. Furthermore, the method allows to determine an optimized surrogate model to approximate friction compensation within the machine tool. The machine tool can be for example a CNC machine tool for milling, laser cutting, punch pressing or other industrial application.

The first step S0 of the method involves generation of a plurality of surrogate models for different machine tools by a regression method based on training data. The training data comprises data sets. Each data set includes a friction compensation parameter set, further also called a parameter set, for setting a machine tool, and a corresponding friction compensation result value. A friction compensation result value results from applying the parameter set to the machine tool and measuring the resulting frictional forces. Hence, the friction compensation result value can be understood as an indicator of the resulting frictional forces within the machine tool, i.e., it can for example be determined based on sensor measurements measuring the friction between machine parts.

The data sets can be generated based on friction measurements at a real machine tool or different machine tools and/or based on a dedicated computer-aided simulation of at least one machine tool. A respective surrogate model for a machine tool is generated based on at least one data set. For generation of the surrogate models a computerized regression method can be used, as for example linear or polynomial models, regression trees, artificial neural networks or Gaussian processes. In embodiments, the surrogate models are generated for a plurality of different machine tools. In embodiments, the generated surrogate models are stored in a database.

In the next step S1 a plurality of surrogate models for approximating friction compensation within machine tools is read in. In an embodiment, from the available surrogate models stored in the database, a sample of surrogate models is selected based on machine-specific identification data of the machine tool, e.g., machine type. A weighting factor is assigned to each surrogate model, wherein, in embodiments, the weighting factor represents a goodness-of-fit of the respective surrogate model approximating the friction compensation response of the real machine tool. At start of the optimization procedure, the weighting factor of each surrogate model can particularly be equally distributed, as e.g., all set to 1.

In the next step S2 a friction compensation parameter set is read in. In an embodiment, the friction compensation parameter set is generated based on given weighting criteria, which is explained below. In general, the friction compensation parameter set comprises for example at least one parameter to control the machine tool, which is also input for a respective surrogate model. The friction compensation parameter set can be proposed based on evaluation of the surrogate models, as explained below. The initially proposed parameter set can for example be an initial estimate.

In the next step S3, based on the inputted friction compensation parameter set, friction compensation result values are determined for each inputted surrogate model. In other words, each surrogate model is evaluated to provide a friction compensation result value based on the parameter set.

In the next step S4, a weighted average is determined based on the compensation result values and the weighting factors of the corresponding surrogate models.

In the next step S5, a quality indicator of the used friction compensation parameter set is determined based on the weighted average compensation result value. The quality indicator represents the quality of the proposed parameter set for reducing friction when applied to the machine tool. The quality indicator can for example have the value of the corresponding weighted average compensation result value and/or multiplied by a given factor or similar.

If the quality indicator fulfills a given quality criterion, e.g., exceeding a given threshold value, the friction compensation parameter set is outputted, step S6, and applied to the machine tool, step S8, for setting the machine tool in such a way that internal friction is reduced. The friction compensation parameter set can for example be transmitted to a machine control unit for controlling the machine tool in order to reduce friction between mechanical parts of the machine tool.

If the quality indicator does not fulfill the given quality criterion, step S7, a second friction compensation parameter set, which differs from the first inputted parameter set, is selected and inputted. Using this second parameter set, second friction compensation result values are determined for the surrogate models. The weighting factors of the surrogate models are not modified in embodiments. A weighted average value of the resulting second friction compensation result values is determined to deduce a quality indicator for the second parameter set. If the quality indicator of the second parameter set meets the given quality criterion, the second friction compensation parameter set is outputted. If it does not meet the quality criterion, the search for a suitable parameter set is repeated. Hence, a suitable parameter set is searched based on this iterative process. In particular, this parameter search can be implemented using a fitness function which uses the surrogate models and the respective weighting factors of the surrogate models.

The friction compensation parameter set which meets the quality criterion is applied to the machine tool, step S8, and a real friction compensation result value can be measured based on the applied parameter set, step S9. In the next step S10, the weighting factors of the surrogate models can be modified depending on the discrepancy between the measured real friction compensation result and each friction compensation result value outputted by each surrogate model. For example, a small difference between the measured and one modelled friction compensation result can transform into a higher weighting of the respective surrogate model. Based on the modified weighting factors of the surrogate models, steps S2 to S8, and to S10 in embodiments, can be repeated, further improving modelling and parameter determination for the machine tool.

Figure 2:
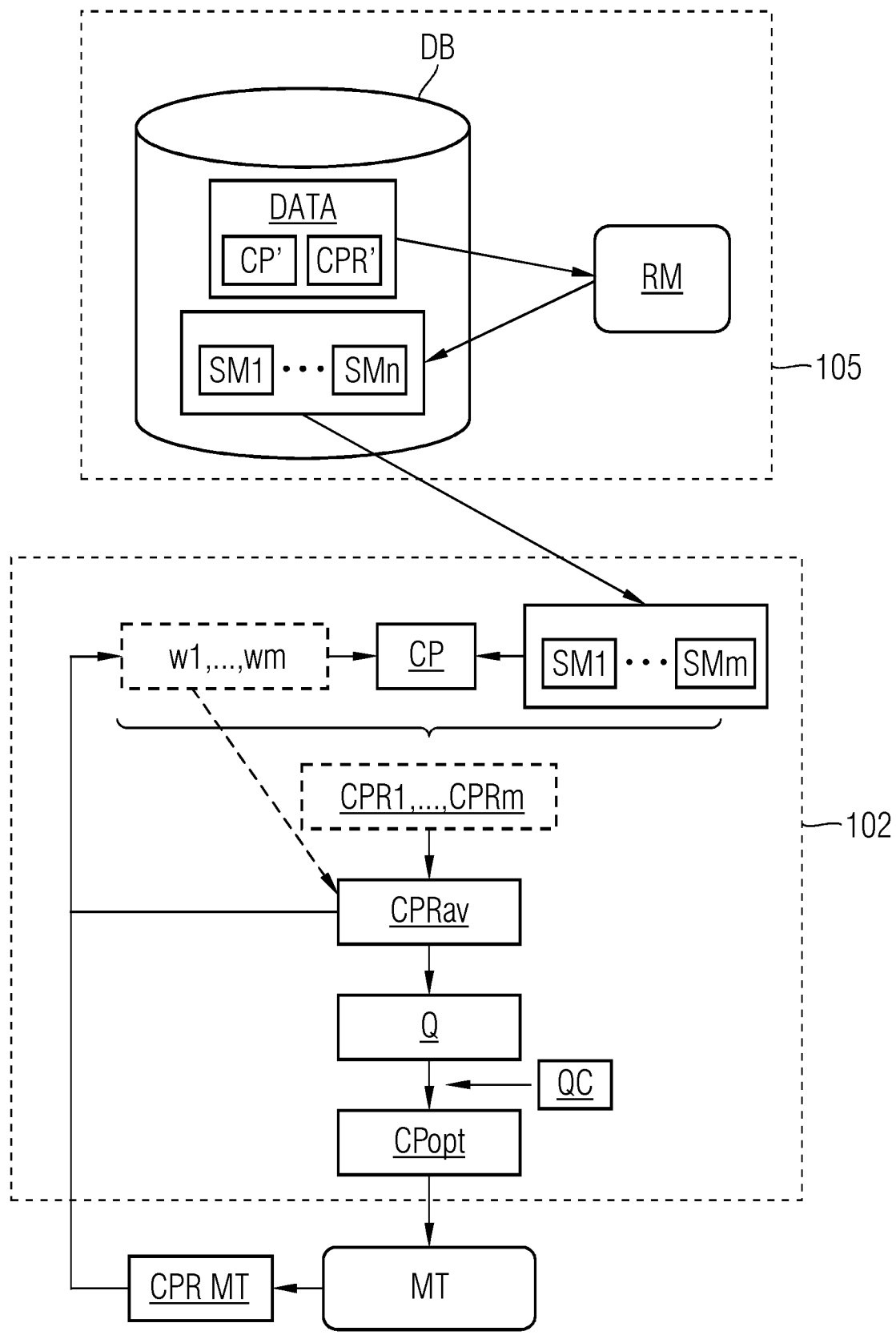
FIG. 2 shows a schematic representation of an embodiment of the method for reducing friction within a machine tool.

FIG. 2 shows schematic representation of an embodiment of the method for reducing friction within a machine tool MT. The representation comprises the surrogate model generation by a generator 103. In embodiments, a model generator 103 comprises a database DB or is connected to a database DB. In embodiments, the database DB comprises training data DATA, which are used to generate surrogate models which are suited to approximate and reproduce frictional forces within machine tools. The training data DATA are based on measurement data and/or simulation data. The training data DATA comprise a plurality of data sets wherein each data set consists of a friction compensation parameter set CP' and a corresponding friction compensation result value CPR'. Using the training data DATA, the generator 103 can generate a plurality of surrogate models SM1, . . . , SMn by a regression method RM. The surrogate models SM1, . . . , SMn can be stored in the database DB.

At least a sample of surrogate models SM1, . . . , SMm is selected from this plurality of surrogate models SM1, . . . , SMn. In embodiments, the selection is based on machine-specific identification data of the machine tool MT. A weighting factor w1, . . . , wm is assigned to each surrogate model SM1, . . . , SMm. A weighting factor w1, . . . , wm represents the goodness-of-fit of the respective surrogate model approximating the friction response of the machine tool.

The selected surrogate models SM1, . . . , SMm are read in by the analysis unit 102. Furthermore, one friction compensation parameter set CP is read in by the analysis unit 102. In an embodiment, the friction compensation parameter set CP is determined using a fitness function based on the selected surrogate models SM1, . . . , SMm and their respective weighting factors w1, . . . , wm.

For each surrogate model SM1, . . . , SMm a corresponding friction compensation result value CPR1, . . . , CPRm, is determined based on the inputted parameter set CP. Using the respective weighting factors w1, . . . , wm, a weighted average value CPRav of these friction compensation result values CPR1, . . . , CPRm is calculated. From this weighted average CPRav a quality indicator Q is deduced to determine the matching quality of the friction compensation parameter set CP. If the quality indicator meets a given quality criterion QC, the friction compensation parameter CP is outputted as an optimized friction compensation parameter CPopt and applied to the machine tool MT. Otherwise, another parameter set can be proposed and evaluated until a parameter set meets the quality criterion QC.

At the machine tool MT, a real friction compensation result value CPR_MT can be measured. For example, frictional forces between two machine parts can be measured using a sensor. By comparing this measured friction compensation result value CPR_MT with the individual friction compensation result values CPR1, . . . , CPRm outputted by the surrogate models SM1, . . . , SMm, the weighting factors w1, . . . , wm of these surrogate models can be adjusted. In other words, the weighting factors of the respective surrogate models are modified based on the fitting quality of the respective model. In an embodiment, more weight is given to the surrogate models SM1, . . . , SMm which predict a compensation result value close to the measured one. Performing these iterative steps further improves the surrogate model weighting as well as the parameter set search, resulting in reduced friction within the machine tool. The iterative parameter search and/or model weighting can be stopped as soon as a given stopping criterion is reached.

Figure 3:
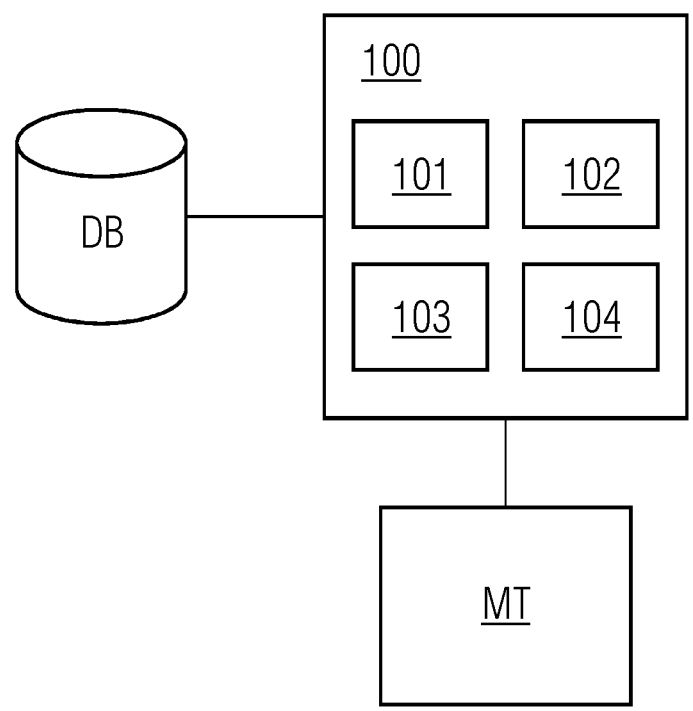
FIG. 3 shows a schematic representation of an embodiment of an apparatus for reducing friction within a machine tool.

FIG. 3 shows a schematic representation of an embodiment of an apparatus 100 for reducing friction within a machine tool MT. In embodiments, the apparatus 100 is connected to the machine tool MT using a wireless or wired connection.

The apparatus comprises an input unit 101 configured to read a plurality of surrogate models for approximating friction compensation within a given machine tool. Each surrogate model is configured such that it assigns a friction compensation result value to a given friction compensation parameter set for reducing friction within a machine tool. A weighting factor is assigned to each surrogate model.

The apparatus 100 further comprises an analysis unit 102 configured to read in a friction compensation parameter set and to determine a friction compensation result value for each surrogate model using the compensation parameter set. The analysis unit 102 is further configured to determine a weighted average friction compensation value of the friction compensation result values using the respective weighting factor of the respective surrogate model and to deduce a quality indicator for the friction compensation parameter set based on the weighted average friction compensation value.

The apparatus 100 further comprises an output unit 103 configured to output the friction compensation parameter set, if the quality indicator fulfills a given quality criterion, and an application unit 104 configured to apply the outputted friction compensation parameter set to the machine tool for reducing friction within the machine tool.

The application unit 104 can further be configured to receive a measured friction compensation result value of the machine tool based on the applied friction compensation parameter set. The measurement can for example be performed by a sensor at or inside the machine tool. The analysis unit 102 can be configured to modify each weighting factor of the respective surrogate model depending on a discrepancy between each friction compensation result value and the measured real friction compensation result value and resulting from the respective surrogate model and to repeat parameter set selection steps.

The apparatus 100 can further comprise a generator 105 configured to generate the plurality of surrogate models for friction compensation based on a given plurality of data sets by a regression method, wherein each data set comprises a friction compensation parameter for setting a machine tool and a corresponding friction compensation result of a resulting reduced friction within the respective machine tool. Alternatively, the generator 105 can be installed separately and connected to the apparatus 100.

The apparatus 100 and/or the generator 105 can further be connected to a database DB, wherein the database is configured to store surrogate models and/or friction compensation data for generation of surrogate models for approximating friction compensation within a machine tool.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for reducing friction within a machine tool, comprising:
   a) reading a plurality of surrogate models for approximating friction compensation within a given machine tool, wherein each surrogate model is configured such that it assigns a friction compensation result value to a given friction compensation parameter set for reducing friction within a machine tool, and wherein a weighting factor is assigned to each surrogate model, the weighting factor representing a goodness-of-fit of a surrogate model to a machine tool,
   b) reading a friction compensation parameter set,
   c) determining a friction compensation result value for each surrogate model using the compensation parameter set,
   d) determining a weighted average friction compensation value of the friction compensation result values using the respective weighting factor of the respective surrogate model,
   e) determining a quality indicator for the friction compensation parameter set based on the weighted average friction compensation value,
   f) outputting the friction compensation parameter set, if the quality indicator fulfills a given quality criterion, or otherwise repeating b) to e) until the quality indicator fulfills the given quality criterion, and
   g) applying the outputted friction compensation parameter set (Reps to the machine tool for reducing friction within the machine tool.

2. The computer-implemented method according to claim 1, further comprising:
   measuring a real friction compensation result value of the machine tool based on the applied friction compensation parameter set,
   modifying each weighting factor of the respective surrogate model depending on a discrepancy between each friction compensation result value and the measured real friction compensation result value resulting from the respective surrogate model,
   and
   repeating b) to g).

3. The computer-implemented method according to claim 1, wherein the plurality of surrogate models is generated based on a given plurality of data sets by a regression method, wherein each data set comprises a friction compensation parameter set and a corresponding friction compensation result value of a resulting reduced friction within the respective machine tool.

4. The commputer-implemented method according to claim 3, wherein at least one data set of the given plurality of data sets is generated based on a friction measurement at a real machine tool.

5. The computer-implemented method according to claim 3, wherein at least one data set of the given plurality of data set is generated based on a dedicated computer-aided simulation of a machine tool.

6. The computer-implemented method according to claim 1, wherein the friction compensation parameter set is generated by a fitness function, wherein the fitness function depends on the surrogate models and the respective weighting factor.

7. The computer-implemented method according to claim 1, wherein the plurality of surrogate models is selected based on machine-specific identification data of the machine tool.

8. An apparatus for reducing friction within a machine tool, comprising:
   a) an input unit configured to read a plurality of surrogate models for approximating friction compensation within a given machine tool, wherein each surrogate model is configured such that it assigns a friction compensation result value to a given friction compensation parameter set for reducing friction within a machine tool, and wherein a weighting factor is assigned to each surrogate model, the weighting factor representing a goodness-of-fit of a surrogate model to a machine tool,
   b) an analysis unit configured to
      read in a friction compensation parameter set,
      determine a friction compensation result value for each surrogate model using the compensation parameter set,
      determine a weighted average friction compensation value of the friction compensation result values using the respective weighting factor of the respective surrogate model,
      and
      determine a quality indicator for the friction compensation parameter set based on the weighted average friction compensation value,
   c) an output unit configured to output the friction compensation parameter set, if the quality indicator fulfills a given quality criterion, or otherwise to repeat the aforementioned steps,
   and
   d) an application unit configured to apply the outputted friction compensation parameter set to the machine tool for reducing friction within the machine tool.

9. The apparatus according to claim 8, wherein the application unit is configured to receive a measured real friction compensation result value of the machine tool based on the applied friction compensation parameter set, and the analysis unit is configured to modify each weighting factor of the respective surrogate model depending on a discrepancy between each friction compensation result value and the measured real friction compensation result value and resulting from the respective surrogate model.

10. The apparatus according to claim 8 comprising a generator configured to generate the plurality of surrogate models for friction compensation based on a given plurality of data sets by a regression method, wherein each data set comprises a friction compensation parameter for setting a machine tool and a corresponding friction compensation result of a resulting reduced friction within the respective machine tool.

11. The apparatus according to claim 8, wherein the apparatus is configured to connect to a database, wherein the database is configured to store data sets and/or the surrogate models.

12. A computer program product, comprising a non-transitory computer readable storage medium having computer readable program code stored therein, said program code executable by a processor of a computer system to implement the method of claim 1.

\* \* \* \* \*